(12) United States Patent  (10) Patent No.: US 7,609,408 B2
Hayashi et al.  (45) Date of Patent: Oct. 27, 2009

(54) IMAGE READING APPARATUS, IMAGE FORMATION APPARATUS, IMAGE PROCESSING SYSTEM, MEMORY AREA SHARING METHOD FOR IMAGE READING APPARATUS, AND MEMORY AREA SHARING METHOD FOR IMAGE PROCESSING SYSTEM

(75) Inventors: Hiroshi Hayashi, Kanagawa (JP); Tadaomi Suzuki, Kanagawa (JP); Hiromi Kita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 498 days.

(21) Appl. No.: 11/396,607

(22) Filed: Apr. 4, 2006

(65) Prior Publication Data

US 2007/0008576 A1 Jan. 11, 2007

(30) Foreign Application Priority Data

Jul. 6, 2005 (JP) ............................. 2005-197014

(51) Int. Cl.
*G06F 3/12* (2006.01)
(52) U.S. Cl. ...................... 358/1.16; 358/1.1; 358/444; 358/474
(58) Field of Classification Search ................ 358/444, 358/448, 474, 1.15, 1.16
See application file for complete search history.

(56) References Cited

U.S. PATENT DOCUMENTS

| | | | | | |
|---|---|---|---|---|---|
| 5,231,515 | A | * | 7/1993 | Endo | 358/447 |
| 5,752,075 | A | * | 5/1998 | Kikinis | 710/1 |
| 5,802,261 | A | * | 9/1998 | Yokoyama | 358/1.16 |
| 5,838,883 | A | * | 11/1998 | Pekelman | 358/1.16 |
| 6,137,591 | A | * | 10/2000 | Kikinis | 358/1.6 |
| 6,480,296 | B1 | * | 11/2002 | Ozaki | 358/1.16 |
| 6,603,570 | B2 | * | 8/2003 | Asahi | 358/1.15 |
| 7,177,972 | B2 | * | 2/2007 | Watanabe | 710/313 |
| 7,346,729 | B2 | * | 3/2008 | Watanabe | 710/313 |
| 2003/0081239 | A1 | * | 5/2003 | Asahi | 358/1.15 |
| 2003/0196011 | A1 | * | 10/2003 | Shih | 710/62 |
| 2004/0227974 | A1 | * | 11/2004 | Hatashita | 358/1.15 |
| 2007/0035769 | A1 | * | 2/2007 | Takato | 358/1.16 |

(Continued)

FOREIGN PATENT DOCUMENTS

JP  A-11-254764  9/1999

(Continued)

*Primary Examiner*—Kimberly A Williams
(74) *Attorney, Agent, or Firm*—Oliff & Berridge, PLC

(57) ABSTRACT

An image processing system in which an image reading apparatus and an image formation apparatus are connected to each other through a communication interface, in which the image reading apparatus includes: a reading section that reads an original and generates image data, a memory that stores the image data, and a mount-processing permission section that, when the image reading apparatus is connected to the image formation apparatus through the communication interface, permits the image formation apparatus to carry out a mount-processing of the memory; the image formation apparatus includes: a mount-processing section that, when the image formation apparatus is connected to the image reading apparatus through the communication interface and permitted to carry out the mount-processing of the memory, carries out the mount-processing of the memory; and the image formation apparatus stores image data received from another communication interface into the memory for which the mount-processing has been carried out.

4 Claims, 7 Drawing Sheets

U.S. PATENT DOCUMENTS

| | | | |
|---|---|---|---|
| 2007/0070397 A1* | 3/2007 | Shimoichi | 358/1.15 |
| 2007/0070398 A1* | 3/2007 | Oshima | 358/474 |
| 2008/0165371 A1* | 7/2008 | Tanaka | 358/1.3 |
| 2008/0180714 A1* | 7/2008 | Ishikawa | 358/1.16 |
| 2008/0239358 A1* | 10/2008 | Uno | 358/1.13 |

FOREIGN PATENT DOCUMENTS

| | | |
|---|---|---|
| JP | A-2004-056220 | 2/2004 |
| JP | A 2005-63422 | 3/2005 |
| KR | 10-2004-0010198 | 1/2004 |

\* cited by examiner of a mount-processing section that, when the image formation apparatus is connected to the image reading apparatus through the communication interface and permitted by

IMAGE READING APPARATUS, IMAGE FORMATION APPARATUS, IMAGE PROCESSING SYSTEM, MEMORY AREA SHARING METHOD FOR IMAGE READING APPARATUS, AND MEMORY AREA SHARING METHOD FOR IMAGE PROCESSING SYSTEM

BACKGROUND OF THE INVENTION

1. Field of the Invention

The present invention relates to an image reading apparatus, an image formation apparatus, an image processing system, a memory area sharing method for the image reading apparatus, and a memory area sharing method for the image processing system, and particularly to an image reading apparatus, an image formation apparatus, an image processing system, a memory area sharing method for the image reading apparatus, and a memory area sharing method for the image processing system that allow a P2P connecting scanner printer system to implement an enhanced function processing.

2. Description of the Related Art

In recent years, multifunction machines having various capabilities, such as those of a copying machine, a printer, a facsimile, and the like, have been put on the market. The multifunction machine prints an image on a printing paper when functioning as a copying machine or a printer, reads an original and generates an image when functioning as a scanner, and sends an image to or receives it from another piece of equipment through a telephone line when functioning as a facsimile.

With a multifunction machine, various types of information processing are executed with a variety of programs, such as an application, a platform, or the like. As the memory destination of a piece of information pertaining to this information processing, various types of memories, such as an HD (Hard Disk), a memory card, and the like, are available, and further, for example, an image formation apparatus, an information processing apparatus, an information processing program, and a memory medium that allow even an HD and a memory card loaded in a PC (Personal Computer) or a server PC to be utilized are available (for example, referring to Japanese Patent Application Laid-Open No. 2005-63422).

In addition, recently, scanners and printers as a single unit having an enhanced capabilities have appeared on the market, and for example, printers that, if additionally equipped with an HD as an option, is capable of covering the function of electronic sorting (a function that is used in printing plural copies for carrying out such an operation as storing the data for a first copy, and printing second and subsequent copies by reading out the stored data, or the like), or the like, have been put on the market.

However, for the user, it is troublesome to additionally install an HD as an option in the printer, and added expenses are required for the additional installation as an option.

Further, in recent years, a scanner printer system that connects the scanner and the printer with an interface that is loosely coupled for both software and hardware has been proposed, and assuming that, in order to realize a copy server in that scanner printer system, not only the scanner but also the printer is additionally provided with an HD, the scanner and the printer both would have an HD, which would be disadvantageous from the viewpoint of cost.

SUMMARY OF THE INVENTION

Then, in the present invention, an HD is provided only for the scanner in the scanner printer system instead of providing both scanner and printer with an HD, and the printer is enabled to use that scanner HD, whereby the present invention provides an image reading apparatus, an image formation apparatus, an image processing system, a memory area sharing method for the image reading apparatus, and a memory area sharing method for the image processing system that allow enhanced capabilities of a printer, such as electronic sorting, and the like, to be implemented.

An aspect of the present invention provides an image processing system in which an image reading apparatus and an image formation apparatus are connected to each other through a communication interface, in which the image reading apparatus includes: a reading section that reads an original and generates image data, a memory that stores the image data read by the reading section, and a mount-processing permission section that, when the image reading apparatus is connected to the image formation apparatus through the communication interface, permits the image formation apparatus to carry out a mount-processing of the memory; the image formation apparatus comprises: a mount-processing section that, when the image formation apparatus is connected to the image reading apparatus through the communication interface and permitted by the image reading apparatus to carry out the mount-processing of the memory, carries out the mount-processing of the memory; and the image formation apparatus stores image data received from another communication interface into the memory for which the mount-processing has been carried out by the mount-processing section.

And another aspect of the present invention provides an image reading apparatus that is connected to an image formation apparatus through a communication interface, which includes: a reading section that reads an original and generates image data, a memory that stores the image data read by the reading section, and a mount-processing permission section that, when the image reading apparatus is connected to the image formation apparatus through the communication interface, permits the image formation apparatus to carry out a mount-processing of the memory.

And another aspect of the present invention provides an image formation apparatus that is connected to an image reading apparatus through a communication interface, which includes: a mount-processing section that, when the image formation apparatus is connected to the image reading apparatus through the communication interface and permitted by the image reading apparatus to carry out a mount-processing of a memory, carries out the mount-processing of the memory, in which image data received from another communication interface is stored in the memory for which the mount-processing has been carried out by the mount-processing section.

And another aspect of the present invention provides an image reading apparatus that is connected to an image formation apparatus through a communication interface, which includes: a reading section that reads an original and generates image data, a memory that stores the image data read by the reading section, and a connection processing section that, when the image reading apparatus is connected to the image formation apparatus through the communication interface, causes the image formation apparatus to recognize the memory as a removable memory.

And another aspect of the present invention provides an image reading apparatus that is connected to an image formation apparatus through a communication interface, comprising: a reading section that reads an original and generates image data, and a memory that stores the image data read by the reading section; and wherein, when the image reading apparatus is connected to the image formation apparatus through the communication interface, the apparatus causes the image formation apparatus to operate and process the memory as an added function of the image formation apparatus.

And another aspect of the present invention provides a memory area sharing method for an image processing system in which an image reading apparatus and an image formation apparatus are connected through a communication interface, in which the image reading apparatus, when connected to the image formation apparatus through the communication interface, permits the image formation apparatus to carry out a mount-processing of a memory included in the image reading apparatus by a mount-processing permission section; and the image formation apparatus carries out the mount-processing of the memory by a mount-processing section, and stores image data received from another communication interface into the memory for which the mount-processing has been carried out by the mount-processing section.

And another aspect of the present invention provides a memory area sharing method for an image reading apparatus that is connected to an image formation apparatus through a communication interface, in which, when the image reading apparatus is connected to the image formation apparatus through the communication interface, a connection processing section causes the image formation apparatus to recognize a memory included in the image reading apparatus as a removal memory.

And another aspect of the present invention provides a memory area sharing method for an image reading apparatus that is connected to an image formation apparatus through a communication interface, in which, when the image reading apparatus is connected to the image formation apparatus through the communication interface, the image reading apparatus causes the image formation apparatus to operate and process a memory included in the image reading apparatus as an added function of the image formation apparatus.

BRIEF DESCRIPTION OF THE DRAWINGS

Embodiments of the present invention will be described in detail based on the following figures, in which.

DETAILED DESCRIPTION OF THE INVENTION

Hereinbelow, embodiments of the image reading apparatus, the image formation apparatus, the image processing system, the memory area sharing method for the image reading apparatus, and the memory area sharing method for the image processing system pertaining to the present invention will be described in detail with reference to the attached diagrams.

First Embodiment

Figure 1:
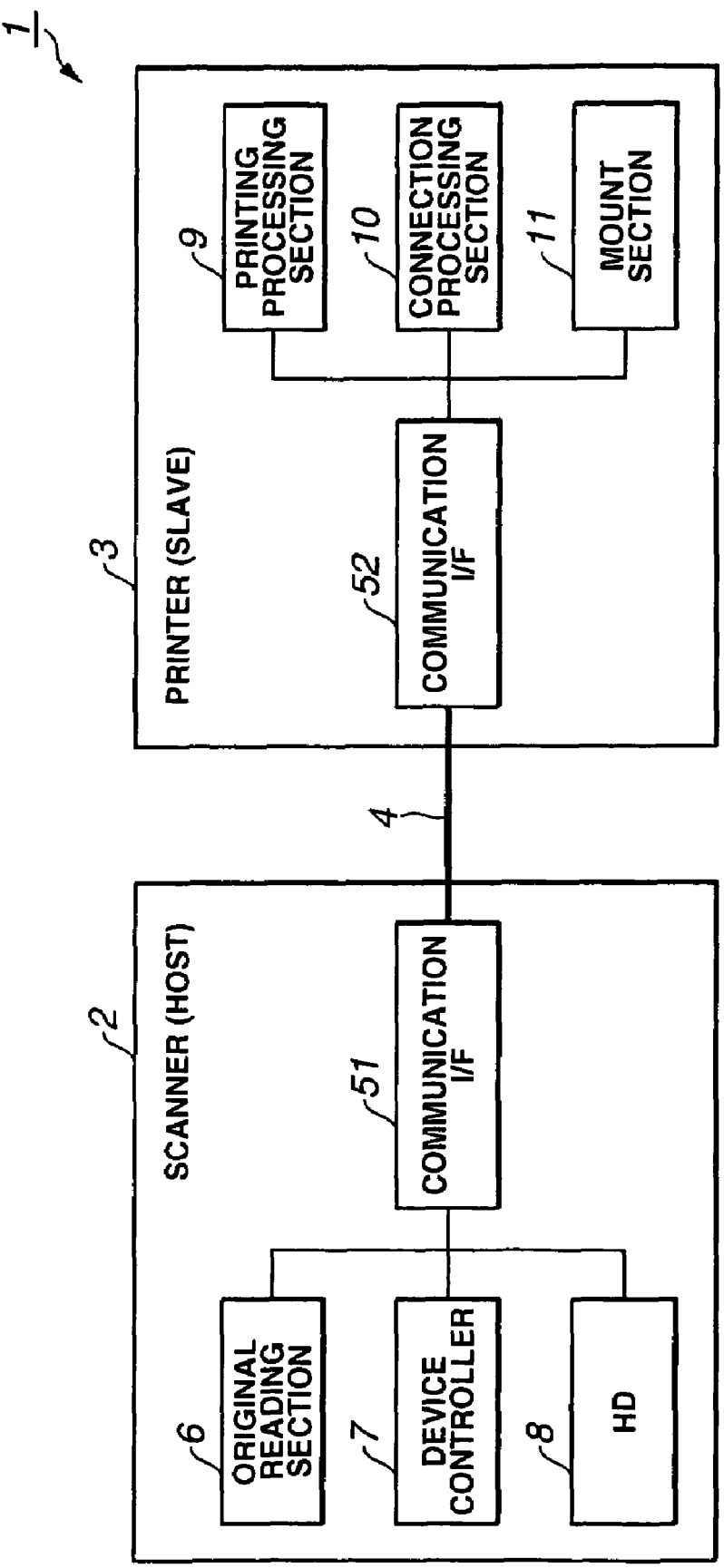
FIG. 1 is a diagram illustrating a first embodiment of the system configuration of a scanner printer system utilizing the image reading apparatus and the image formation apparatus pertaining to the present invention.

FIG. 1 is a diagram illustrating a first embodiment of the system configuration of a scanner printer system 1 utilizing the image reading apparatus and the image formation apparatus pertaining to the present invention.

As shown in FIG. 1, the scanner printer system 1 is configured by connecting between a scanner 2 and a printer 3 through a USB cable 4, or the like, having a USB (Universal Serial Bus) standard interface. The interface connecting between the scanner 2 and the printer 3 need not be limited to the USB standard interface, and the scanner 2 and the printer 3 may be connected to each other using a wire circuit, such as an IEEE (the Institute of Electrical and Electronic Engineers) 1394 cable, a LAN (Local Area Network) cable, an RS-232C cable, or the like, or a wireless circuit, such as a wireless LAN, an IrdA (Infrared Data Association) radio communication circuit, or the like.

However, in the present embodiment, the scanner printer system 1 in which the scanner and the printer are connected through the USB cable 4 is used as an example for description, and for connection through a USB cable, the devices to be connected with each other have to have an established relationship as the host and the slave, thus the scanner 2 is handled as a piece of host equipment, and the printer 3 as a piece of slave equipment.

The scanner 2 is the image reading apparatus pertaining to the present invention, and the printer 3 is the image formation apparatus pertaining to the present invention.

As shown in FIG. 1, the scanner 2 is configured to comprise a communication I/F (Interface) 51, an original reading section 6, a device controller 7, and an HD 8.

The communication I/F 51 is an interface for carrying out data communication with the device (i.e., the printer 3) connected through the USB cable 4.

The original reading section 6 reads an original and carries out processing for generating image data (hereafter called a scanned image), being composed of an image sensor, such as a CCD (Charge Coupled Device), or the like, a carriage on which the image sensor is loaded, or otherwise a motor for moving the original, and the like.

The device controller 7 implements the host function of the USB, and carries out processing for controlling the device (i.e., the printer 3) that is connected through the USB cable 4. It is made up by operating the processor with software (i.e., a driver), or composed of an IC (Integrated Circuit) for device control, and the like.

The HD 8 is a memory for storing a various types of data.

As shown in FIG 1, the printer 3 is configured to comprise a communication I/F 52, a printing processing section 9, a connection processing section 10, and a mount section 11.

The communication I/F 52 is an interface for carrying out data communication with the device (i.e., scanner 2) connected through the USB cable 4.

The printing processing section 9 carries out printing processing of a scanned image, printing data, and the like.

The connection processing section 10 implements the slave function of the USB, being made up by operating the processor with software (i.e., a driver), or composed of an IC for the slave function, and the like.

The mount section 11 recognizes the, HD 8 in the scanner 2 connected, and carries out mount-processing for rendering it operational. It also carries out unmount-processing for disconnecting the HD 8.

Figure 2:
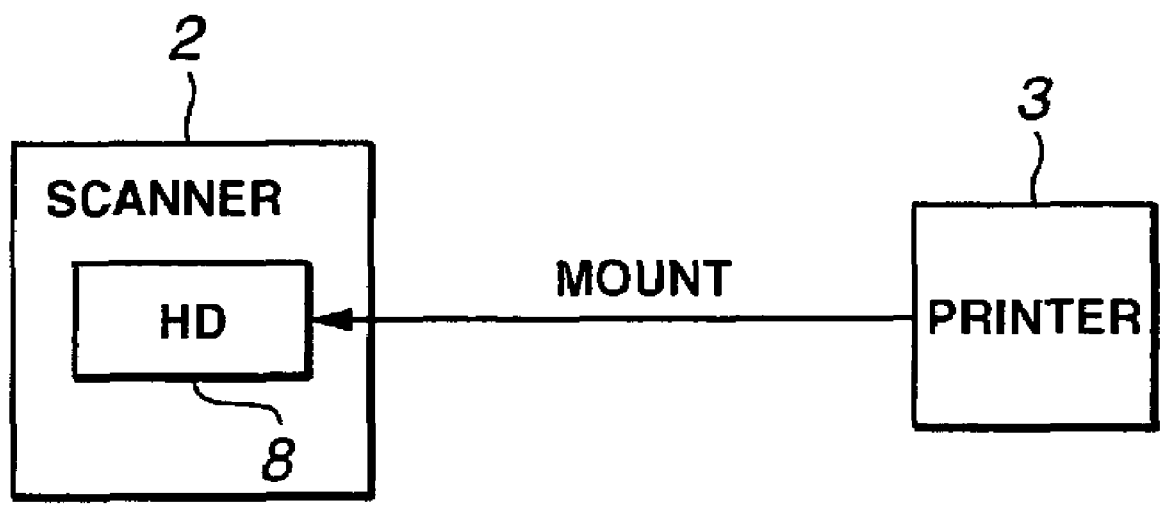
FIG. 2 is a diagram for describing sharing of the HD of the scanner by the printer.

In the present system, in order to enable the printer 3 to share the HD 8 of the scanner 2, the scanner 2 permits the printer 3 to mount the HD 8 of the scanner 2 as shown in FIG. 2 when the connection between the scanner 2 and the printer 3 is established, and the printer 3 mounts the HD 8 of the scanner 2, whereby the printer 3 is made possible to utilize the HD 8 of the scanner 2.

Figure 3:
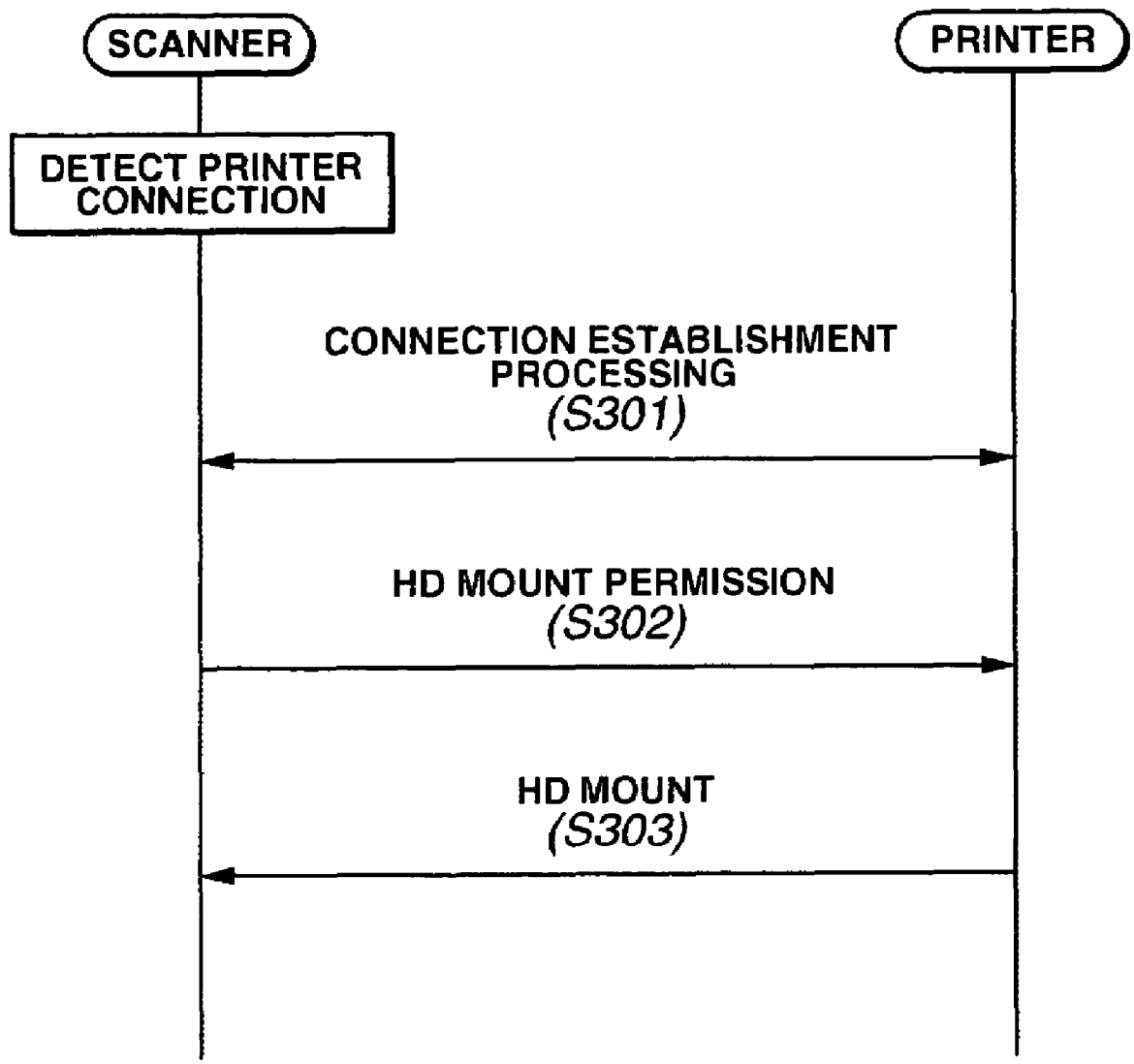
FIG. 3 is a sequence diagram illustrating the flow of processing for causing the HD of the scanner to be shared by the printer in the present system.

Next, the flow of processing for causing the HD 8 of the scanner 2 to be shared by the printer in the present system will be described with reference to a sequence chart as shown in FIG. 3.

When the device controller of the scanner detects the connection to the printer, the device controller of the scanner and the connection processing section of the printer carry out processing for establishing the connection of the scanner printer system (at step S301), and when the connection is established, the device controller of the scanner notifies the printer of a permission for mounting the HD (at step S302), and the mount section of the printer carries out mount-processing of the HD of the scanner (at step S303).

Figure 4:
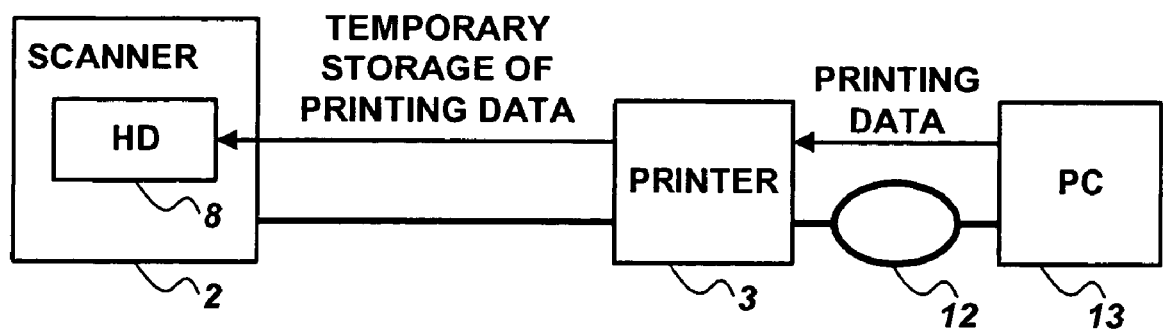
FIG. 4 is a diagram for describing utilization of the HD 8 of the scanner by the printer.

Thus, the present system is configured such that the printer can utilize the HD of the scanner, whereby, as shown in FIG. 4, the printer is made possible to temporarily accumulate the printing data received from a PC 13, or the like, through a network 12 into the HD of the scanner, which allows the electronic sorting function to be implemented.

Second Embodiment

Figure 5:
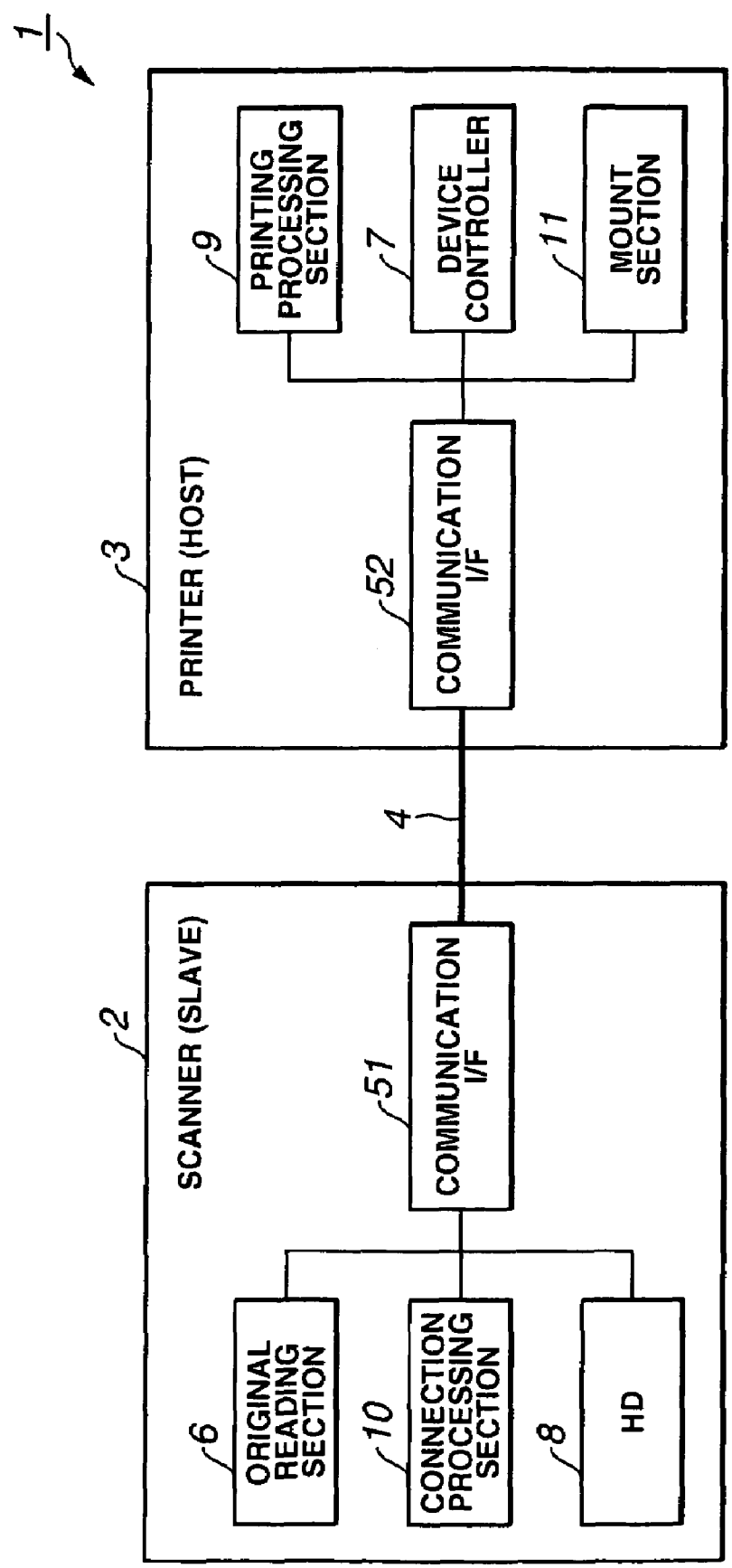
FIG. 5 is a diagram illustrating a second embodiment of the system configuration of the scanner printer system utilizing the image reading apparatus and the image formation apparatus pertaining to the present invention.

FIG. 5 is a diagram illustrating a second embodiment of the system configuration of the scanner printer system 1 utilizing the image reading apparatus and the image formation apparatus pertaining to the present invention.

As shown in FIG. 5, the scanner printer system 1 is configured by connecting between a scanner 2 and a printer 3 through a USB cable 4, or the like, having a USB standard interface. The interface connecting between the scanner 2 and the printer 3 need not be limited to the USB standard interface, and the scanner 2 and the printer 3 may be connected to each other using a wire circuit, such as an IEEE 1394 cable, a LAN cable, an RS-232C cable, or the like, or a wireless circuit, such as a wireless LAN, an IrdA radio communication circuit, or the like.

However, in the present embodiment, the scanner printer system 1 in which the scanner and the printer are connected through the USB cable 4 is used as an example for description, and for connection through a USB cable, the devices to be connected with each other have to have an established relationship as the host and the slave, thus the scanner 2 is handled as a piece of slave equipment, and the printer 3 as a piece of host equipment.

The scanner 2 is the image reading apparatus pertaining to the present invention, and the printer 3 is a general-purpose image formation apparatus having a host function (for example, an image formation apparatus, or the like, which can be directly operated for printing from a digital camera, or the like, through a USB).

As shown in FIG. 5, the scanner 2 is configured to comprise a communication I/F 51, an original reading section 6, a connection processing section 10, and an HD 8.

The communication I/F 51 is an interface for carrying out data communication with the device (i.e., the printer 3) connected through the USB cable 4.

The original reading section 6 reads an original and carries out processing for generating image data (hereafter called a scanned image), being composed of an image sensor, such as a CCD, or the like, a carriage on which the image sensor is loaded, or otherwise a motor for moving the original, and the like.

The connection processing section 10 implements the slave function of the USB, being made up by operating the processor with software (i.e., a driver), or composed of an IC for the slave function, and the like.

The HD 8 is a memory for storing various types of data.

As shown in FIG. 5, the printer 3 is configured to comprise a communication I/F 52, a printing processing section 9, a device controller 7, and a mount section 11.

The communication I/F 52 is an interface for carrying out data communication with the device (i.e., scanner 2) connected through the USB cable 4.

The printing processing section 9 carries out printing processing of a scanned image, printing data, and the like.

The device controller 7 implements the host function of the USB, and carries out processing for controlling the device that is connected through the USB cable 4. It is made up by operating the processor with software (i.e., a driver), or composed of an IC for device control, and the like.

The mount section 11 recognizes the HD 8 in the scanner 2 connected, and carries out mount-processing for rendering it operational. It also carries out unmount-processing for disconnecting the HD 8.

Figure 6A:
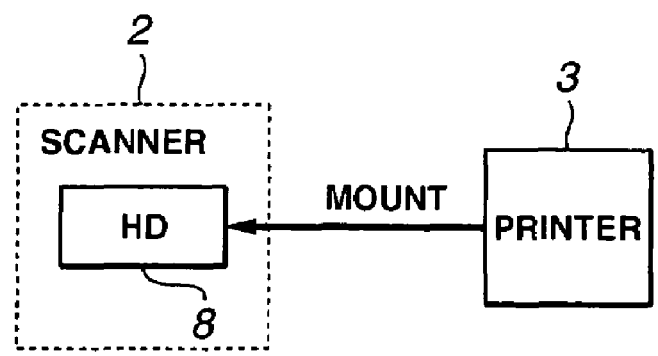
FIG. 6A and FIG. 6B are diagrams for describing sharing of the HD of the scanner by the printer.

In the present system, in order to enable the printer 3 to share the HD. 8 of the scanner 2, the scanner 2 enables the printer 3 to recognize the HD 8 as a removable memory (specifically, which can be implemented by adopting a USB Mass Storage Class compatible interface in the scanner 2) as shown in FIG. 6A when the connection between the scanner 2 and the printer 3 is established, and the printer 3 mounts the HD 8 of the scanner 2, whereby the printer 3 is made possible to utilize the HD 8 of the scanner 2.

Figure 6B:
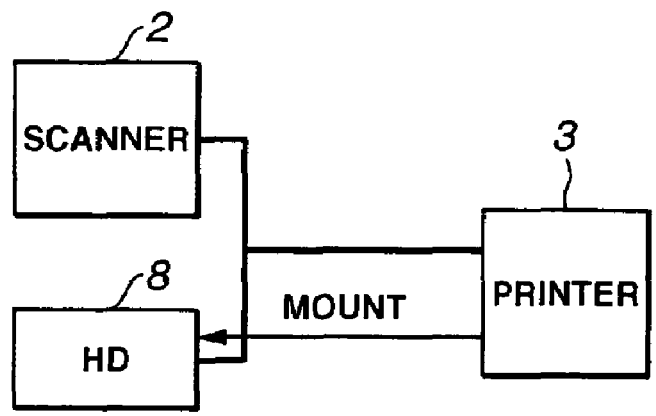

In addition, in order to enable the printer 3 to share the HD 8 of the scanner 2, the scanner 2 enables the printer 3 to recognize the scanner 2 and the HD 8 as being connected in parallel, as shown in FIG. 6B when the connection between the scanner 2 and the printer 3 is established, and the printer 3 mounts the HD 8, recognizing it as a removable memory, whereby the printer 3 is made possible to utilize the HD 8 of the scanner 2.

Figure 7:
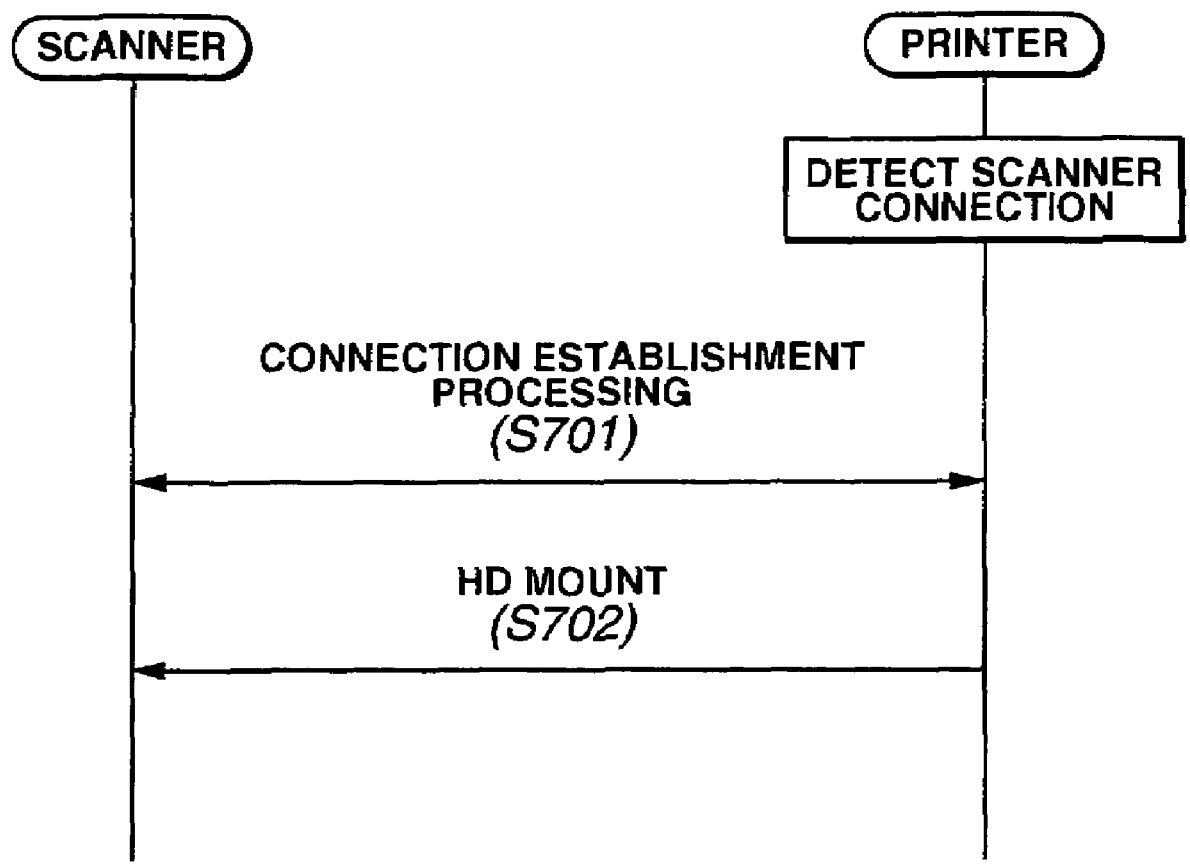
FIG. 7 is a sequence diagram illustrating the flow of processing for causing the HD of the scanner to be shared by the printer in the present system.

Next, the flow of processing for causing the HD 8 of the scanner 2 to be shared by the printer in the present system will be described with reference to a sequence chart as shown in FIG. 7.

When the device controller of the printer detects the connection to the scanner, the device controller of the printer and the connection processing section of the scanner carry out processing for establishing the connection of the scanner printer system (at step S701), and when the connection is established, the mount section of the printer carries out mount-processing of the HD of the scanner (at step S702).

Thus, the present system is configured such that the printer can utilize the HD of the scanner, whereby, as described in the first embodiment, the printer is made possible to temporarily accumulate the printing data received from a PC, or the like, through a network into the HD of the scanner, which allows the electronic sorting function to be implemented.

As described above, an aspect of the present invention provides an image processing system in which an image reading apparatus and an image formation apparatus are connected to each other through a communication interface, in which the image reading apparatus includes: a reading section that reads an original and generates image data, a memory that stores the image data read by the reading section, and a mount-processing permission section that, when the image reading apparatus is connected to the image formation apparatus through the communication interface, permits the image formation apparatus to carry out a mount-processing of the memory; the image formation apparatus comprises: a mount-processing section that, when the image formation apparatus is connected to the image reading apparatus through the communication interface and permitted by the image reading apparatus to carry out the mount-processing of the memory, carries out the mount-processing of the memory; and the image formation apparatus stores image data received from another communication interface into the memory for which the mount-processing has been carried out by the mount-processing section.

And another aspect of the present invention provides an image reading apparatus that is connected to an image formation apparatus through a communication interface, which includes: a reading section that reads an original and generates image data, a memory that stores the image data read by the reading section, and a mount-processing permission section that, when the image reading apparatus is connected to the image formation apparatus through the communication interface, permits the image formation apparatus to carry out a mount-processing of the memory.

And another aspect of the present invention provides an image formation apparatus that is connected to an image reading apparatus through a communication interface, which includes: a mount-processing section that, when the image formation apparatus is connected to the image reading apparatus through the communication interface and permitted by the image reading apparatus to carry out a mount-processing of a memory, carries out the mount-processing of the memory, in which image data received from another communication interface is stored in the memory for which the mount-processing has been carried out by the mount-processing section.

And another aspect of the present invention provides an image reading apparatus that is connected to an image formation apparatus through a communication interface, which includes: a reading section that reads an original and generates image data, a memory that stores the image data read by the reading section, and a connection processing section that, when the image reading apparatus is connected to the image formation apparatus through the communication interface, causes the image formation apparatus to recognize the memory as a removable memory.

And another aspect of the present invention provides an image reading apparatus that is connected to an image formation apparatus through a communication interface, comprising: a reading section that reads an original and generates image data, and a memory that stores the image data read by the reading section; and wherein, when the image reading apparatus is connected to the image formation apparatus through the communication interface, the apparatus causes the image formation apparatus to operate and process the memory as an added function of the image formation apparatus.

And another aspect of the present invention provides a memory area sharing method for an image processing system in which an image reading apparatus and an image formation apparatus are connected through a communication interface, in which the image reading apparatus, when connected to the image formation apparatus through the communication interface, permits the image formation apparatus to carry out a mount-processing of a memory included in the image reading apparatus by a mount-processing permission section; and the image formation apparatus carries out the mount-processing of the memory by a mount-processing section, and stores image data received from another communication interface into the memory for which the mount-processing has been carried out by the mount-processing section.

And another aspect of the present invention provides a memory area sharing method for an image reading apparatus that is connected to an image formation apparatus through a communication interface, in which, when the image reading apparatus is connected to the image formation apparatus through the communication interface, a connection processing section causes the image formation apparatus to recognize a memory included in the image reading apparatus as a removal memory.

And another aspect of the present invention provides a memory area sharing method for an image reading apparatus that is connected to an image formation apparatus through a communication interface, in which, when the image reading apparatus is connected to the image formation apparatus through the communication interface, the image reading apparatus causes the image formation apparatus to operate and process a memory included in the image reading apparatus as an added function of the image formation apparatus.

According to the present invention, the scanner printer system is configured such that the printer can utilize the HD of the scanner, whereby an effect that the printer can implement an enhanced function, such as the electronic sorting, or the like, without the need for additionally installing an HD is obtained.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-197014 filed on Jul. 6, 2005 including specification, claims, drawings and abstract is incorporated herein by reference in its entirety.

What is claimed is:

1. An image processing system in which an image reading apparatus and an image formation apparatus are connected to each other through a communication interface, wherein the image reading apparatus comprises:
   a reading section that reads an original and generates image data,
   a memory that stores the image data read by the reading section, and a mount-processing permission section that, when the image reading apparatus is connected to the image formation apparatus through the communication interface, permits the image formation apparatus to mount the memory for use as a memory on the image formation apparatus by carrying out a mount-processing of the memory;

the image formation apparatus comprises:

a mount-processing section that, when the image formation apparatus is connected to the image reading apparatus through the communication interface and permitted by the image reading apparatus to carry out the mount-processing of the memory, carries out the mount-processing of the memory; and the image formation apparatus stores image data received from another communication interface into the memory for which the mount-processing has been carried out by the mount-processing section.

2. An image reading apparatus that is connected to an image formation apparatus through a communication interface, comprising:

a reading section that reads an original and generates image data, a memory that stores the image data read by the reading section, and a mount-processing permission section that, when the image reading apparatus is connected to the image formation apparatus through the communication interface, permits the image formation apparatus to mount the memory for use as a memory on the image formation apparatus by carrying out a mount-processing of the memory.

3. An image formation apparatus that is connected to an image reading apparatus having a memory through a communication interface, comprising: a mount-processing section that, when the image formation apparatus is connected to the image reading apparatus through the communication interface, is permitted by the image reading apparatus to mount the memory for use as a memory on the image formation apparatus by carrying out a mount-processing of the memory, wherein image data received from another communication interface is stored in the memory for which the mount-processing has been carried out by the mount-processing section.

4. A memory area sharing method for an image processing system in which an image reading apparatus having a memory and an image formation apparatus are connected through a communication interface, wherein the image reading apparatus, when connected to the image formation apparatus through the communication interface, permits the image formation apparatus to mount the memory for use as a memory on the image formation apparatus by carrying out a mount-processing of the memory, included in the image reading apparatus by a mount-processing permission section; and the image formation apparatus carries out the mount-processing of the memory by a mount-processing section, and stores image data received from another communication interface into the memory for which the mount-processing has been carried out by the mount-processing section.

* * * * *